United States Patent [19]

Lamphere

[11] Patent Number: 5,613,888
[45] Date of Patent: Mar. 25, 1997

[54] FISHERMAN'S MARKER

[76] Inventor: Jeffrey T. Lamphere, 1851 Pheasant Dr., Excelsior, Minn. 55331

[21] Appl. No.: 579,479

[22] Filed: Dec. 27, 1995

[51] Int. Cl.$^6$ ................................................ B63B 22/16
[52] U.S. Cl. ................................................ 441/6; 441/23
[58] Field of Search ........................ 441/1, 6, 23, 26, 441/28

[56] References Cited

U.S. PATENT DOCUMENTS

| | | | |
|---|---|---|---|
| 1,993,974 | 3/1935 | McVicker | 441/26 |
| 4,074,380 | 2/1978 | Parker | 441/26 |
| 4,501,563 | 2/1985 | Johnson et al. | 441/26 |
| 5,087,216 | 2/1992 | Noggle | 441/26 |

Primary Examiner—Stephen Avila
Attorney, Agent, or Firm—Roger W. Jensen

[57] ABSTRACT

Apparatus for marking a preselected reference point on the water surface of a lake having a bottom surface comprising a float member with parallel top and bottom surfaces and two sides defining a cradle for holding a plurality of turns of fine line. The float member further includes at least one weight receiving recess in the top or bottom, a central bore and a line attaching rod member extending perpendicularly through the bore. A weight member is provided having a preselected shape permitting the snug positioning thereof in the recess. A preselected length of fine line is connected at one end to the rod and at the other end to the weight member.

2 Claims, 2 Drawing Sheets

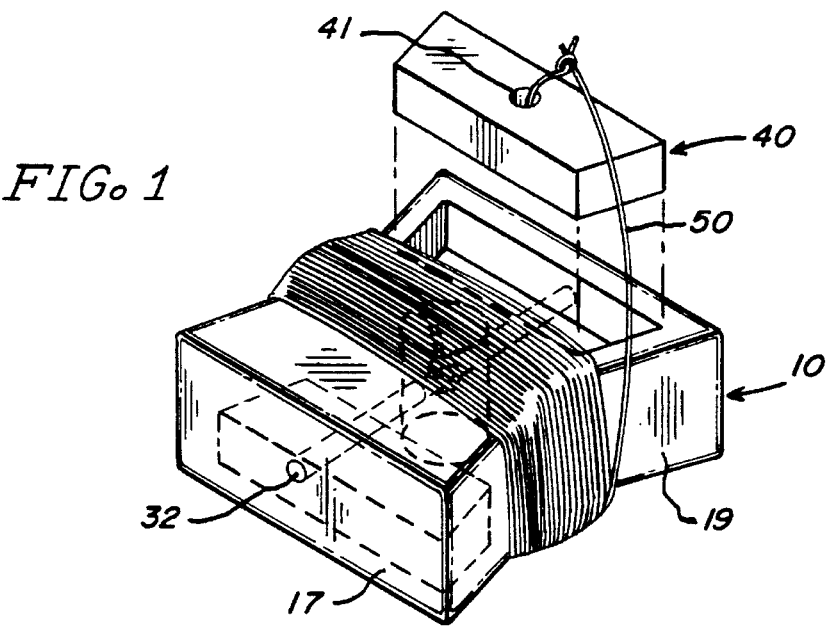

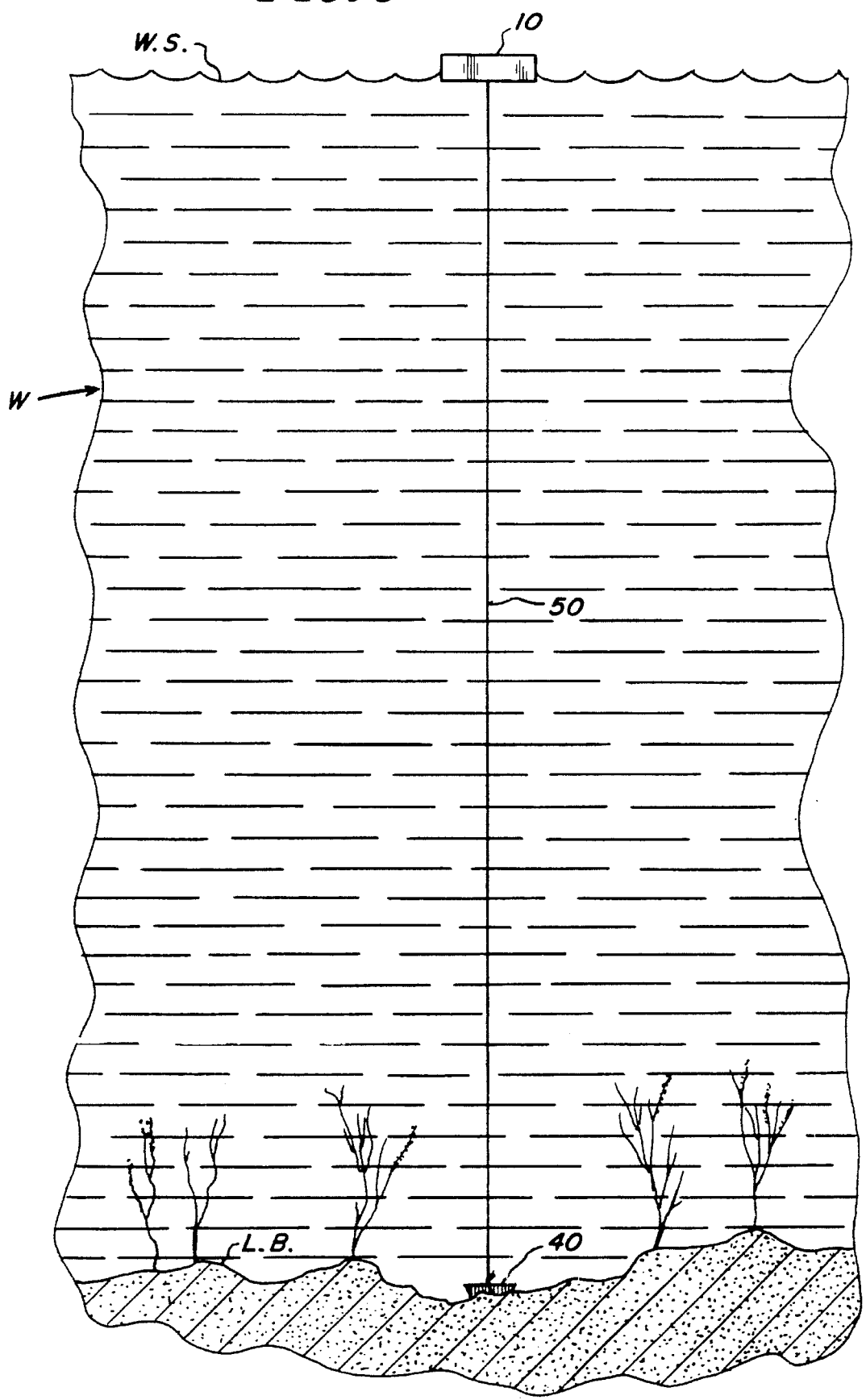

FISHERMAN'S MARKER

BACKGROUND OF THE INVENTION

1. Field of the Invention

The present invention generally relates to float apparatus which may be anchored on the bottom of a lake so as to mark a particular or preselected reference point such as a "hot" fishing spot.

2. Description of Prior Art

Fishermen have long used various floats such as pieces of wood and empty bottles or jugs tethered by a line and weight over a preselected reference point on the lake bottom so that the float member floats on the surface to provide a visual signal to the fisherman concerning such preselected reference point.

SUMMARY OF THE INVENTION

The present invention provides such an apparatus in a unique configuration comprising a float member having a top with a bottom generally parallel thereto and two sides and two ends. The sides of the float member define a cradle for holding a plurality of turns of fine line. The float member has at least one weight receiving recess disposed in either the top or the bottom with a centrally positioned bore extending from the top to the bottom and with a centrally positioned rod member transversely extending through the bore. The apparatus further includes a weight member having a shape preselected so the weight may be snugly positioned in and thereby housed in the weight receiving recess. Finally a preselected length of line is provided connected at one end thereof to the rod member through said central bore and connected at the other end to the weight member, the line being wrapped around the float member in the cradle when the apparatus is not in use, that is to say, being stored for example in a fisherman's tackle box. When the fisherman wants to mark a preselected reference point then the weight is removed from the recess and released into the water of the lake so as to fall to the lake bottom at a position which is a preselected reference point, enough of the line being uncoiled from the float member to permit the weight to rest on the lake bottom with the result that the float member floats on the surface of the lake being tethered by the line and the weight generally above said preselected reference point.

DESCRIPTION OF THE DRAWINGS

In the following detailed description, reference will be made to the attached drawings in which:

FIG. 1 is an isometric, partially exploded view of the apparatus.

FIGS. 2 and 3 are respectively top and bottom views of the apparatus.

FIG. 4 is a cross-section of the float member as viewed along section lines 4—4 of FIG. 2.

FIG. 5 is a cross-section of the float member as viewed along section lines 5—5 of FIG. 2.

FIGS. 6 and 7 are respectively a top view and a side view of the weight member.

FIG. 8 is a pictorial representation of the cross-section of a portion of a lake showing the float member floating on the water surface being tethered to the lake bottom by the line and weight.

DETAILED DESCRIPTION OF THE INVENTION

FIG. 1 depicts the apparatus in the ready or unused or standby condition comprising a float member 10, a weight member 40, and a line 50. The line is connected at one end thereof to a rod 32 passing transversely through the float member 10 and then is wound with a plurality of turns or coils around the sides of the float member and the other end thereof is connected to the weight member 40 by passing through an appropriate bore 41 in the weight member and being fastened by an appropriate knot or equivalent.

Referring to FIGS. 2–5, the float member is made of a suitable material such as plastic having a density less than the density of water and has a top 12, a bottom 14, two ends 16 and 17 and two sides 18 and 19. The sides 18 and 19 are each, in the preferred embodiment, tapered or sloped inwardly from the ends 16 and 17 so as to define a centrally located cradle 20–21 respectively.

The float member further has at least one weight receiving recess disposed in the top or in the bottom of the float member. In the preferred embodiment as depicted in the drawings, the float member has two weight receiving recesses 24 and 26 disposed respectively in the top 12 and in the bottom 14 of said float member, the recess 24 being adjacent to end 16 and the recess 26 being adjacent to end 17. The recess 24 has a depth designated by the reference AA shown in FIG. 5. As shown in FIG. 2, the recess 24 has a shape of a truncated cone or trapezoid with sides 24' and 24" and ends 24'" and 24"" which are shown to be spaced from and generally parallel to the sloped or tapered sides 18 and 19 of the float member.

Recess 26 is shaped essentially identical to recess 24 having the same depth AA and with its sides and ends being identified by reference numerals 26', 26", 26'" and 26"", respectively.

The float member 10 further comprises a centrally positioned bore 30 extending through member 10 from the top 12 to the bottom 14 along the longitudinal axis of the float member. A rod member 32 is transversely positioned in said float member so as to bridge across the centrally positioned bore 30 with the longitudinal axis of the rod member being generally perpendicular to the longitudinal axis of the bore. It is important that the rod be held firmly in the aforedescribed position by the float member. As depicted in FIG. 1, the rod member 32 extends transversely through said float member from end 16 to end 17 thereof; it will be understood however that it is not essential that the rod be that long, a shorter length being satisfactory so long as it is sufficiently anchored to provide a secure point of attachment for the end of the line 50 as is shown in phantom in FIG. 1.

The weight member 40 is made of a suitable material such as lead or other metal having a density greater than water. As shown in FIG. 6, the weight has a truncated cone shape with parallel sides 40' and 40" and tapered sides 40'" and 40"" as well as a central bore 41. The end view shown in FIG. 7 indicates that the thickness of the weight member is the dimension AA. The weight member 40 has an elongated shape with its dimensions preselected so that the weight member may be snugly positioned in and housed in one of the recesses 24 or 26, it being understood that either recess may be selected for the storage function. An advantage of having two recesses 24 and 26 is that the buoyancy of the float member is increased.

FIG. 8 shows a cross-section of a lake with the float 10 floating on the water surface W.S. of the lake. The float is tethered by line 50 and weight 40 resting on the lake bottom L.B. at a preselected reference point.

The present invention and its advantages will be understood from the foregoing description and it will be apparent that various changes may be made thereto without departing from the spirit and scope of the invention, the form described being the preferred embodiment thereof.

The embodiments of an invention in which an exclusive property or right is claimed are defined as follows:

1. Apparatus for marking a preselected reference point on the water surface of a lake having a bottom surface, the apparatus comprising:

a) a float member having a density less than water, the float member having a top, a bottom, two sides, and two ends and being shaped with the top and bottom being generally parallel, and with the sides defining a cradle for holding a plurality of turns of fine line; the float member further having (i) at least one weight receiving recess disposed in the top or in the bottom, (ii) a centrally positioned bore extending from the top to the bottom, and (iii) a centrally positioned rod member extending through the bore transversely through the float member from end to end thereof;

b) a weight member having a density greater than water and a shape preselected so that the weight may be snugly positioned in and housed in one of the at least one weight receiving recess; and c) a preselected length of fine line connected at one end thereof to the rod member through the central bore, wrapped in successive turns around the sides in the defined cradle with the other end of the line being connected to the weight member;

whereby the apparatus may be utilized by the weight (connected to one end of the line) being removed from one of the at least one recess and released into the water of the lake so as to fall to the lake bottom at a position which is a preselected reference point, the line being connected at the other end to the float and enough of the line being uncoiled from the float member to permit the weight to rest on the lake bottom with the result that the float member floats on the surface of the lake being tethered by the line and the weight generally above the preselected reference point.

2. Apparatus for marking a preselected reference point on the water surface of a lake having a bottom surface, the apparatus comprising:

a) a float member having a density less than water, the float member having a top, a bottom, two sides, and two ends and being shaped with the top and bottom being generally parallel, and with the sides defining a cradle for holding a plurality of turns of fine line;

the float member further having (I) two weight receiving recesses disposed respectively in the top of the float adjacent to one of the ends, and in the bottom adjacent to the other of the ends, (ii) a centrally positioned bore extending longitudinally from the top to the bottom of the float member, and (iii) a rod member positioned in the centrally positioned bore with the longitudinal axis of the rod member generally perpendicular to the longitudinal axis of the bore, the rod member extending transversely through the float member from end to end thereof;

b) a weight member having a density greater than water and a shape preselected so that the weight may be snugly positioned in and housed in one of the weight receiving recesses; and c) a preselected length of fine line connected at one end thereof to the rod member through the central bore, wrapped in successive turns around the sides in the defined cradle with the other end of the line being connected to the weight member;

whereby the apparatus may be utilized by the weight (connected to one end of the line) being removed from one of the recesses and released into the water of the lake so as to fall to the lake bottom at a position which is a preselected reference point, the line being connected at the other end to the float and enough of the line being uncoiled from the float member to permit the weight to rest on the lake bottom with the result that the float member floats on the surface of the lake being tethered by the line and the weight generally above the preselected reference point.

\* \* \* \* \*